July 14, 1942.  J. R. HUNT  2,289,428
SHEAVE BLOCK ASSEMBLY AND SUPPORTING MEANS THEREFOR
Filed Oct. 31, 1941
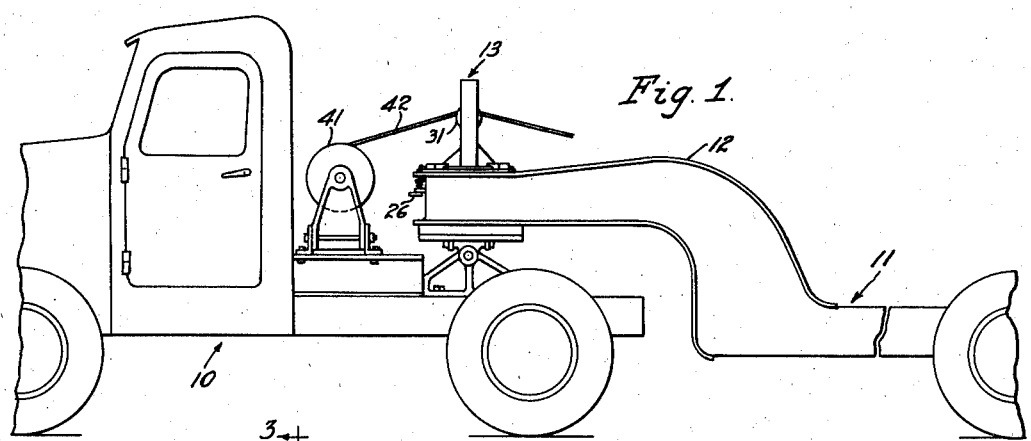
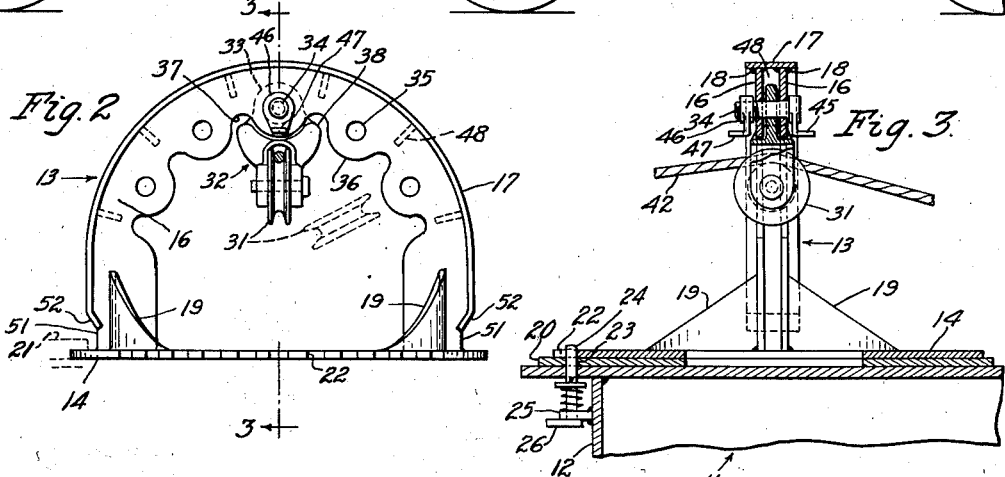
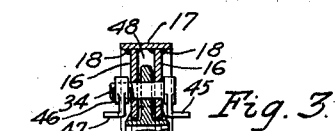
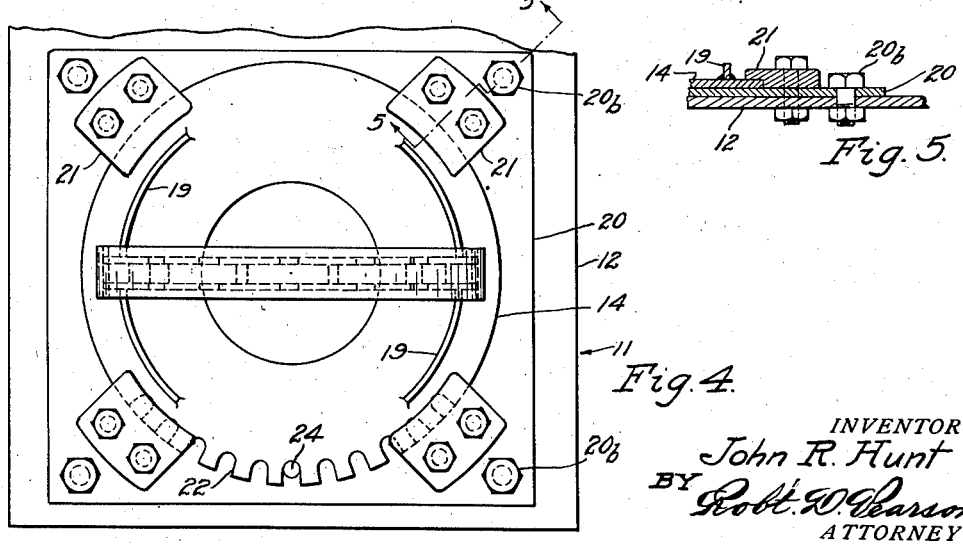
INVENTOR
John R. Hunt
BY Robt. W. Pearson
ATTORNEY Patented July 14, 1942

2,289,428

UNITED STATES PATENT OFFICE 2,289,428

SHEAVE BLOCK ASSEMBLY AND SUPPORTING MEANS THEREFOR

John R. Hunt, Los Angeles, Calif.

Application October 31, 1941, Serial No. 417,376

9 Claims. (Cl. 254—190)

This invention relates to a sheave block assembly and to supporting means therefor.

Among the objects of the invention are: To provide, in combination with a pulley and its supporting block designed to carry heavy loads, a superior guard means to prevent workmen from being injured in case of breakage of the traction or hoisting cable; to provide an improved adjustable supporting means for the pulley block so that considerable variation in the direction of cable pull may be allowed to take place without impairing efficiency of operation; and to provide a device particularly well adapted to be operated by the engine of a tractor, or truck, to load heavy objects onto a vehicle trailable by said tractor, or truck.

Other objects, advantages and features of invention will hereinafter appear.

Referring to the accompanying drawing, which illustrates what is at present deemed to be a preferred embodiment of the invention, Fig. 1 is a side elevation showing the invention applied to a traction truck, or tractor, and a truck trailed thereby, portions of said trucks being broken away in order to contract the view. The scale of this view is smaller than that of the remaining views.

Fig. 2 is a side elevation of the structure for adjustably supporting the pulley and its block. The pulley is shown in dotted lines in one of the angular positions to which it may be adjusted.

Fig. 3 is a vertical section on line 3—3 of Fig. 2, additional underlying structure being included.

Fig. 4 is a plan of the structure shown in Fig. 3.

Fig. 5 is a sectional detail on line 5—5 of Fig. 4.

Referring in detail to the drawing, in Fig. 1 is shown a front truck 10 with which is connected a rear truck 11 which has a forward overhead extension 12 whereby it is connected to said front truck to be trailed thereby.

Upon the upper side of the trailing extension 12 is secured an arcuate housing or standard 13 which is shown as including an annular bed plate 14 upon which is mounted a pair of twin segmental arcuate plates 16 that are in a parallel spaced relation to each other, a rim or bridge plate 17 extending along their peripheral edges and being secured to them by welding 18. Triangular strut plates 19 are welded or otherwise secured in place at each side of the basal portion of the arcuate standard 13 to secure it to the bed plate 14 in a stable manner. Said bed plate 14 is supported upon a base plate 20 to turn through an arc of considerable extent in relation to the latter plate. Said bed plate has through it an arcuate row of notches or apertures 22 which are individually alineable with an aperture 23 in the base plate, and a spring pressed locking pin 24 cooperates with this structure to lock the two plates in the desired rotationally adjusted relation to each other. Said pin slides through a keeper 25 carried by the front portion of the extension 12 of the trailed truck. Said locking pin is of a conventional type and is provided with an operating handle 26. The bed plate 14 is turnably held in place upon the base plate 20 by means of bearing plates 21 secured to the latter plate. Said base plate is shown secured to the rear truck extension 12 by means of clamping bolts 20b.

A pulley 31 is supported by a carrier 32 having an upwardly extending suspending part 33 projectable between the inner portions of the arcuate plates 16. Said part 33 is apertured to receive loosely the hanger pin 34, said pin being insertable through alined apertures 35 in the inner edge portion of the arcuate plates 16. Each of said apertures 35 is located concentrically of one of the arcuate projections 36 provided along the inner edges of the plates 16. Between these projections 36 the plates 16 have rounded recesses 37 which conform in shape to the rounded ends of wings or shoulders 38 with which the carrier 32 is provided. Said carrier is swingable upon the pin to either side till its shoulder 38 at that side abuts against the adjacent recess 27.

Upon the front truck is mounted a winch 41 onto which is wound the cable 42, said cable passing over the pulley 31 and thence being led to the object to be hoisted or drawn upon the rear truck.

Referring to additional details of construction, the base plate 20 as well as the bed plate 14, is shown apertured in order to make room throughout its central portion for any upwardly projecting part carried by the extension 12.

The pin 34 of the pulley carrier is shown having an annular lateral extension 45 from its headed end to keep it from turning and its nut 46 is shown having a like extension 47 to prevent unscrewing.

The peripheral portion of the housing 13 is shown furnished with internal reinforcing plates 48 which may be welded or otherwise secured in place.

In Fig. 2 the arcuate plates 16 are shown having their outer edges recessed at 51 adjacent to the bed plate, and the rim plate 17 has at each end an inwardly deflected part 52, said deflected ends overlying only the upper portions of said recesses. The ends of the rim plate are therefore positioned to clear the bearing plates 21 when the bed plate is rotated more than a quarter turn, and the outer edges of the arcuate plates likewise clear said bearing plates.

In the operation of the device the pulley and its carrier will be centrally mounted upon the standard 13 when direct rear to front traction is to be performed by the cable 42, but when an object is to be drawn toward the trucks from one side or the other the bolt 34 of the pulley carrier will be shifted to one of the other pairs of holes 35, the pair of holes selected being at the side of the truck 10 opposite to the side where the object to be loaded is located. The bed plate 22 will also be rotationally adjusted as may be necessary properly to aline the pulley 31 for traction at the required angle in relation to the length of the truck 10. When the pulley 31 is mounted in any of the lateral positions (that is to say in any position other than the full line position of Fig. 2), the lowermost of the carrier shoulders 38 will abut against a pair of the recesses 37 and will keep the pulley in approximately its proper operative position even though the cable be allowed to slacken. The winch may be operated by the engine of the front truck.

I claim:

1. In a device of the kind described, a support; an arcuate housing mounted thereon, said housing including a pair of segmental arcuate plates in a parallel spaced relation to each other, and a rim plate which extends along, is secured to and bridges the space between the outer edges of said plates; a pulley, a carrier for said pulley, said carrier having a part projectable between the inner edges of said plates, and means to detachably support said carrier by its said part at different points along the inner peripheral portion of said pair of plates.

2. The subject matter of claim 1 and, said carrier supporting means consisting of a pin projectable through said part of said carrier and through alined apertures in said pair of plates.

3. In a device of the kind described, a support; an arcuate housing mounted thereon, said housing including a pair of segmental arcuate plates in a parallel spaced relation to each other, and a rim plate which extends along, is secured to and bridges the space between the outer edges of said plates; the inner edges of said segmental plates being furnished with shoulders, and a pulley carrier one portion of which projects between inner edge portions of said plates and is there pivotally attached, whereby said pulley carrier is supported to swing through an arc limited by contact of opposite sides thereof with said shoulders.

4. The subject matter of claim 3 and, the shoulders of each plate being arranged in a spaced apart arcuately extending series, and said pulley carrier being attachable at different parts of the arc.

5. In combination, a truck having a forward extension whereby it may be trailed, an arcuate standard mounted upon said extension, a bed plate connected to said standard and supported in a rotationally adjustable relation to said extension, a pulley carrier, and means to attach said carrier to different parts of the arc of said standard.

6. The subject matter of claim 5 and, said bed plate having an arcuate, concentric row of seats, and a locking pin cooperating with said seats and the aforesaid extension to lock said bed plate in various rotational positions.

7. In a device of the kind described, a truck, an arcuate standard mounted thereon, said standard including two plates secured together in a parallel adjacent opposite relation to each other, a pulley carrier having an apertured extension insertable between the inner edge portions of said plates, a hanger bolt for said carrier insertable through the aperture of its extension and through apertures provided for it in said plates, and a nut to screw on to one end portion of said bolt, said nut and the head of the bolt each having a radial extension heavy enough to gravitate downwardly and prevent unscrewing of the nut.

8. In combination, a support, a base plate mounted thereon, means to lock said base plate in different rotational positions in relation to said support, a standard supported on said base plate having an arcuate upper portion, a pulley carrier, a pulley carrier thereon, and means to attach said carrier to different portions of the arc of said standard in a position to support the pulley in an inwardly spaced relation to said arc.

9. In combination, a support, a bed plate mounted thereon, means to lock said bed plate in different rotational positions in relation to said support, a standard including a pair of plates each of an arcuate character and a rim plate, said standard being supported by and extending diametrically across said bed plate, and circularly arranged bearing members for said bed plate, said bearing members being fixed to said support in an overhanging relation to the periphery of said bed plate, the outer edges of the lower ends of said pair of plates being recessed to clear said bearing members.

JOHN R. HUNT.